S. SLOCOMB.
Candlestick.
No. 21,987. Patented Nov. 2, 1858.
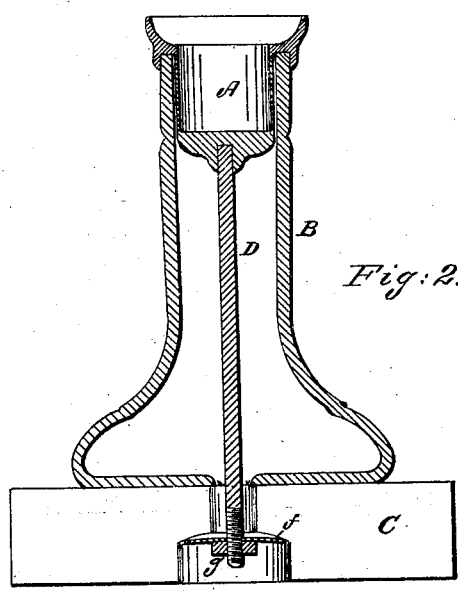
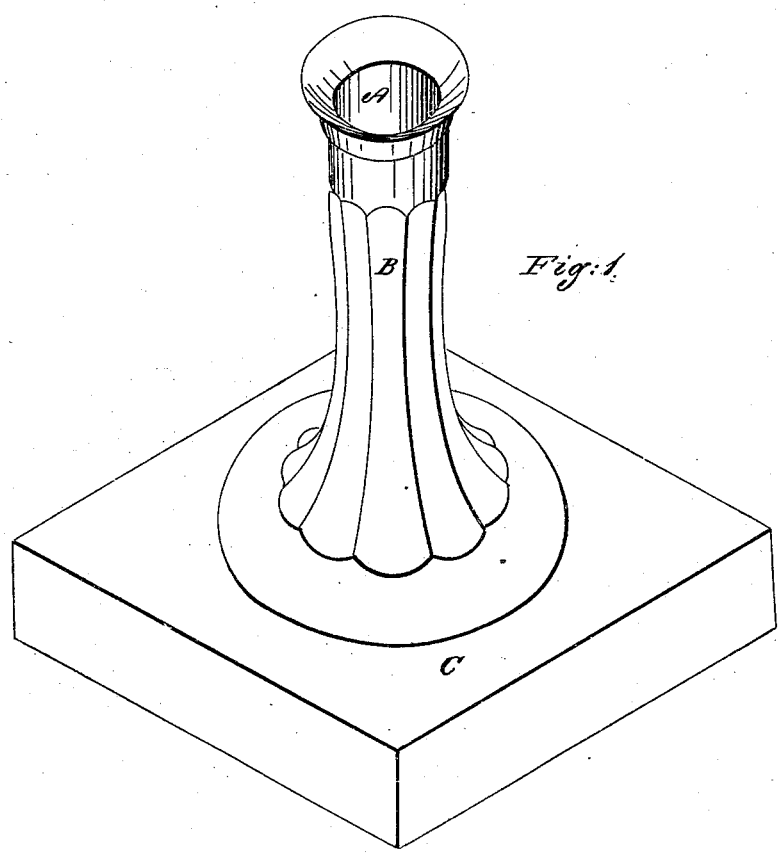

UNITED STATES PATENT OFFICE.

S. SLOCOMB, OF CAMBRIDGE, MASSACHUSETTS.

CANDLESTICK, &c.

Specification of Letters Patent No. 21,987, dated November 2, 1858.

*To all whom it may concern:*

Be it known that I, SAMUEL SLOCOMB, of Cambridge, in the county of Middlesex and State of Massachusetts, have invented a new Lamp-Stand or Candlestick, of which the following is a full, clear, and exact description, reference being had to the accompanying drawings, making part of this specification, in which—

Figure 1, is a view of the lamp stand. Fig. 2, a section through the same.

A lamp stand or candlestick for common household use should possess certain properties which are not furnished by any material heretofore employed in the manufacture of these articles.

1st. The socket or that part of the stand which holds the candle or the lamp should be of a material that will not be easily broken or injured by the flame of a candle when it is employed as a candlestick or by bruises, from a lamp when it is used as a lamp stand. 2d. The shank or that part of the stand which comes in contact with the hand should be of a material that is easily cleansed, and without offensive smell when handles as is the case with brass or bronze. 3d. For the base, a material is required that shall not be easily broken or injured, and also one that is easily kept clean—and of which a sufficient weight can be had at a small expense to make the stand steady. It is obvious that brass or bronze will not fulfil all these conditions, it may answer for the socket, but it is too difficult to cleanse to answer for the shank and however thoroughly it may be cleaned it leaves an unpleasant odor upon the hand which is objectionable.

For the shank nothing can be more suitable than glass, though this material will manifestly not answer for the socket, as it would be cracked and broken by the flame of the candle or by contact with the lamp when used as a lamp stand.

For the base, no material can be more suitable than marble, as it is of small original cost, readily cleaned, and not easily broken or injured, this material would not however be suitable for the other parts of the stand, on account of the expense of working and polishing it.

To unite the advantages of these different materials without the disadvantages to which each of them are liable I have invented the lamp stand which is represented in the accompanying drawings. The socket A, is of metal, the shank B of glass, and the base C, of marble or other stone, which in the shape required for this purpose may be readily and cheaply worked and is not easily broken or injured.

From the socket A, descends a metal rod D, which passes through the shank and into the base, being secured in the latter by a washer *f* and nut *g*.

I thus obtain at a very small cost a lamp stand that is easily cleansed, not easily broken, and which leaves no unpleasant smell upon the hand.

What I claim as my invention and desire to secure by Letters Patent as a new article of manufacture is—

A lamp stand having a metal socket, a glass shank, and a marble base, the whole being secured together by the rod D, as set forth.

SAML. SLOCOMB.

Witnesses:
 THOS. R. ROACH,
 P. E. TESCHEMACHER.